United States Patent [19]

Freier et al.

[11] Patent Number: 4,829,632
[45] Date of Patent: May 16, 1989

[54] HANDLE ASSEMBLY OR THE LIKE

[75] Inventors: Donald P. Freier, Sheboygan; Jack W. Steffen, Plymouth; Michael M. Kecman, Milwaukee, all of Wis.

[73] Assignee: Kohler Co., Kohler, Wis.

[21] Appl. No.: 191,357

[22] Filed: May 6, 1988

Related U.S. Application Data

[63] Continuation-in-part of Ser. No. 143,983, Jan. 13, 1988, abandoned.

[51] Int. Cl.$^4$ .......................... B25G 1/00; B25G 3/00; E05B 1/00
[52] U.S. Cl. .................. 16/114 R; 16/111 R; 16/117; 403/305
[58] Field of Search ............. 16/111 R, 114 R, 116 R, 16/117, 118, 121, DIG. 24, DIG. 30, DIG. 40, DIG. 41; 74/545, 551.1, 551.9, 553, 557; 251/291, 369; 403/43, 299, 300, 305, 307

[56] References Cited

U.S. PATENT DOCUMENTS

| | | | |
|---|---|---|---|
| 1,518,224 | 12/1924 | Seidemann et al. | 16/114 R |
| 1,685,643 | 9/1928 | Micali | 16/114 R |
| 2,542,941 | 2/1951 | Post | |
| 2,574,648 | 11/1951 | Mason | 403/305 |
| 4,349,940 | 9/1982 | Fleischmann et al. | 16/117 |

OTHER PUBLICATIONS

Kohler advertisement (and a cross-sectional drawing thereof) showing the "Cygnet Handle".
Kalista advertisement showing the "Minos" handle together with a cross-sectional view thereof and photos thereof.

*Primary Examiner*—Nicholas P. Godici
*Assistant Examiner*—William Scott Andes
*Attorney, Agent, or Firm*—Quarles & Brady

[57] ABSTRACT

A handle assembly includes an open-ended sleeve connectable to a valve stem by a screw inserted and removed through the open end. A removable thimble has a lateral opening which aligns with a lateral opening in the sleeve. A handle member is held intact to the thimble and sleeve by an internal threaded connection. In one embodiment, the internal connection is provided by threads of two handle members and the thimble. In another embodiment, a screw extends from one handle member for connection with the other with the head housed in a cavity which is covered by a cap. The handle assembly can also be provided with decorative rings positioned between the handle members and the thimble. In a preferred embodiment, the threaded engagement with the thimble is afforded by a first cross member inside the thimble and a second cross member represented by a handle member covering the thimble opening.

9 Claims, 4 Drawing Sheets

4,829,632

HANDLE ASSEMBLY OR THE LIKE

CROSS REFERENCE TO RELATED APPLICATIONS

This is a continuation-in-part of application Ser. No. 143,983, filed Jan. 13, 1988, now abandoned.

BACKGROUND OF THE INVENTION

A. Field Of The Invention

This invention relates particularly to decorative handle assemblies, preferably those used to control rotatable valve stems. The invention is also useful for securing a handle like element in other instances (e.g. in conjunction with a door).

B. Description Of The Art

In most faucet assemblies, an exposed valve control stem is provided with a fluted attachment head having a threaded screw hole at its outer end. The typical faucet handle has a fluted socket that receives the head, and an attachment screw is inserted through an access hole that opens through the outer end of the handle. A decorative sleeve usually surrounds the exposed portion of the valve stem below the handle, and is held between the handle and a countertop or the like.

Without more in such assemblies, the attachment screw is exposed. For ease of cleaning and appearance, various attempts have been made to hide the access hole and the screw. For example, special snap covers have been developed that can be placed over a top access hole and removed when appropriate. However, the use of such snap covers on the top of the design can detract from the decorative appearance of the top of the handle. The use of side set screws has also been tried, but this can also detract from the decorative appearance of the neck of the handle and can be awkward.

A handle assembly which addresses many of the foregoing problems is described in U.S. Pat. No. 4,349,940. However, a handle of that type may not be as vandalism resistant as desired in certain commercial installations where vandalism is a serious problem. Further, such a handle has a cross member having several different metal components.

Thus, there is a need for an improved handle assembly which is capable of securely connecting a decorative faucet handle or the like to a stem without the need for an exposed attachment screw.

SUMMARY OF THE INVENTION

The invention provides a handle assembly or the like connectable to a support. In a preferred embodiment, an open-ended sleeve is provided which is connectable to the support by fastener inserted and removed through the open end, the sleeve having at least one aligned opposite cross opening near the open end. A thimble portion covers the open end and has at least one opening for alignment with the cross opening. A first cross member is engageable in an opening of the thimble portion. A handle arm not integral with the first cross member extends from the thimble portion opposite the fist cross member. A threaded connecting means is disposed within the thimble portion to hold the sleeve and the first cross member in place.

In one embodiment, a thimble has opposite openings aligned with cross openings in the sleeve and there are two cross members engageable in the thimble openings and secured therein by the threaded connecting means.

In another embodiment a thimble covers the open end, the thimble having opposite openings aligned with the cross openings and being internally threaded. A first cross member is engageable in openings of the sleeve and the thimble, the first member having external threads for engagement with the internal threads of said thimble. A second cross member not integral with the first cross member is engageable in openings of the sleeve and the thimble, the second member having external threads for engagement with the internal threads of said thimble. The threads of the thimble and the first and second cross members hold the thimble and the first and second members in place.

In another embodiment the threaded connecting means includes a screw secured in an axial through bore of one of the cross members and threads in the other of the cross members for engagement with the screw threads.

In still another embodiment, the threaded connecting means includes first cross members positionable entirely between the ends of the thimble and second cross members which cover the thimble opening and hide the first cross members from view.

The invention is adaptable to other applications such as a towel bar support or robe hook by using a base bracket having a post shaped like a conventional valve stem and then attaching a similar sleeve and thimble. One of the cross members may be, for example, a towel or robe hook.

The objects of the invention therefore include:

a. providing a handle assembly of the above kind in which the handle members may be operatively connected to the stem by a hidden connecting means;

b. providing an assembly of the above kind in which the cross members can be identical to each other so as to reduce the cost of manufacturing;

c. providing an assembly of the above kind which is more tamper proof;

d. providing an assembly of the above kind in which many of the same components can be employed in either a tamper proof or non-tamper proof unit.

e. providing an assembly of the above kind which affords a stable unit; and f. providing an assembly of the above kind which is easily assembled.

These and still other objects and advantages of the invention will be apparent from the description which follows. In the detailed description below, the preferred embodiments of the invention will be described in reference to the accompanying drawings. These embodiments do not represent the full scope of the invention. Rather the invention may be employed in other embodiments. Reference should therefore be made to the claims herein for interpreting the breadth of the invention.

DESCRIPTION OF THE PREFERRED EMBODIMENT

Figure 1:
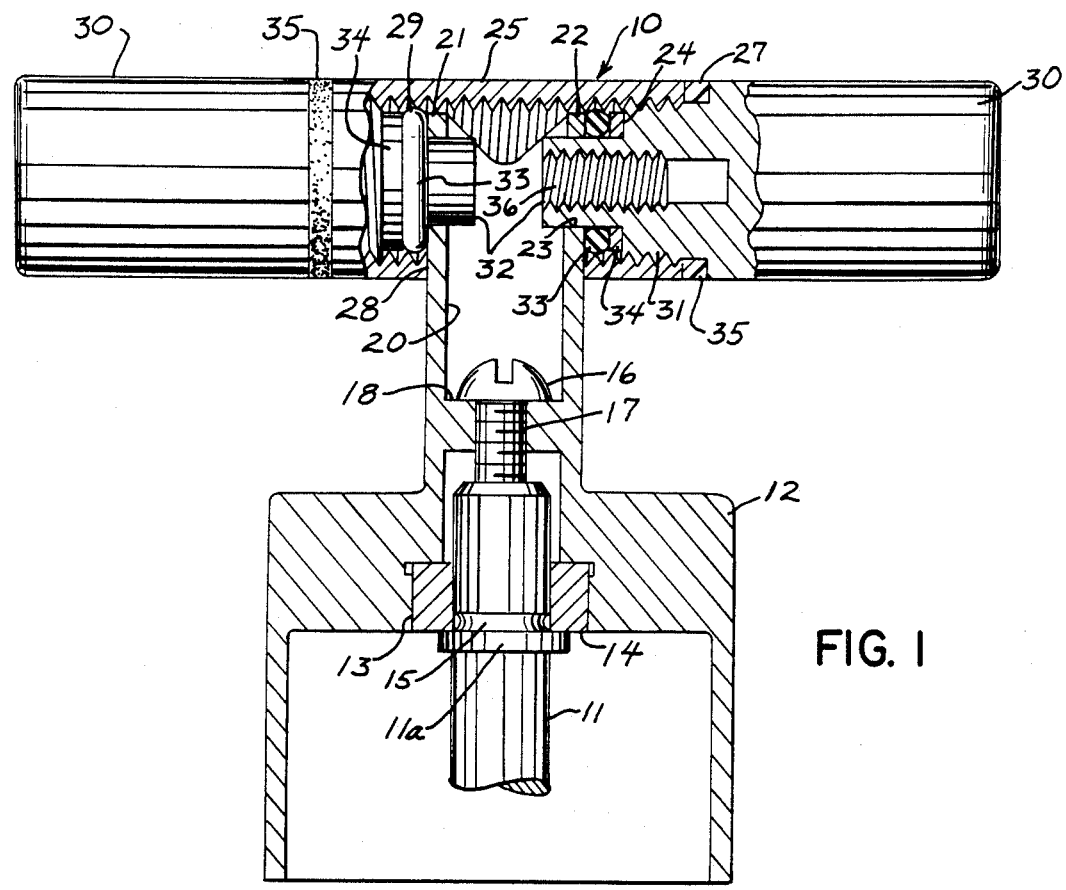
FIG. 1 is a view, partially in cross section and with parts broken away, showing a faucet handle assembly constituting one embodiment of the invention, the assembly being shown attached to a valve stem.
Figure 2:
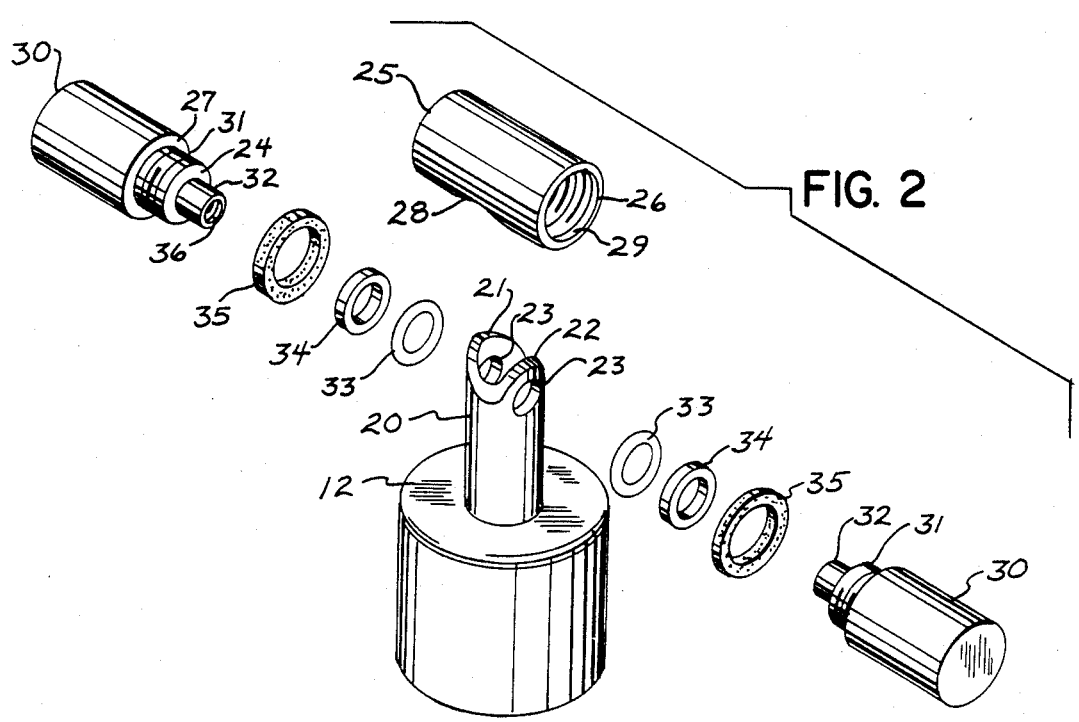
FIG. 2 is an exploded perspective view of the parts shown in FIG. 1.

Referring to FIGS. 1 and 2, the handle assembly generally 10 is shown in conjunction with a threaded valve stem 11. It includes a sleeve 12 having an annular compartment 13 for receiving a spline adapter 14. The sleeve 12 rests on the spline adapter 14. The spline adapter 14 rests on a narrowing portion 15 so as to be retained on the valve stem shoulder 11a. A mounting screw 16 passes through a through bore 17 and against a stop 18 for mounting the handle assembly 10 to the valve stem 11. As best seen in FIG. 2, the sleeve 12 has stem portion 20 which has an open top for reception of the screw 16. It also has the radiused shoulders 21 and 22 for positioning in the bottom opening 28 of the thimble 25. The opening 28 and the shoulders 21 and 22 are dimensioned so that the shoulders can be received inside the thimble a sufficient distance so that a limited rotating arrangement is provided.

As best seen in FIG. 2, the thimble 25 has internal threads 29 as well as opposing openings one of which is shown at 26. This is afforded by the fact that thimble 25 is an open tubular member. The handle assembly 10 also includes two identical handle end pieces 30 each having a reduced diameter threaded portion 31 and a further reduced diameter extension 32. There is also shown the indexing rings 35 which are secured against a shoulder 27 adjacent to the threaded portions 31 as well as the brass washers 34 and the rubber O-rings 33 for placement over the extension portions 32. If desired the extension portions can be internally threaded such as shown at 36 for purposes of which will be later explained.

Referring specifically to FIG. 1, it will be seen that the thimble 25 is adapted to be placed over the end of the stem portion 20. The threaded portions 31 of the handle end pieces 30 are threaded into the internal threads 29 of the thimble 25 with the O-rings 33 and the brass washers 34 placed on the extensions 32 and the indexing rings 35 placed against shoulder 27 adjacent to the threaded portions 31. The handle end pieces 30 are turned until the indexing rings 35 are in contact with the thimble 25 and abut against the shoulders 27, and the O-rings 33 press against the stem portion 20 and the washers 34 press against the shoulders 24. When fully assembled, the handle assembly 10 appears as in FIG. 1.

A secure fitment of the handle end pieces 30 to the thimble 25 as well as to the stem portion 20 is afforded by the extension portions 32 projecting into the opposed openings 23 of the stem portion 20. When assembled, the exposed indexing rings 35 provide a decorative effect as they can be of various colors and positioned between the handle end pieces 30 and the thimble 25. This provides a smooth and aesthetic looking handle as the handle end pieces 30 and the thimble 25 have the same outside diameter. The purpose of the O-rings 33 and the brass washers 34 are to provide a spacing and resilient connection between the handle pieces 30 and the thimble 25 as well as the sleeve 12 for any tolerances. The O-rings in their compressed state compensate for tolerance build up as well as provide a lock washer effect with the washers to prevent the end pieces from loosening.

Figure 3:
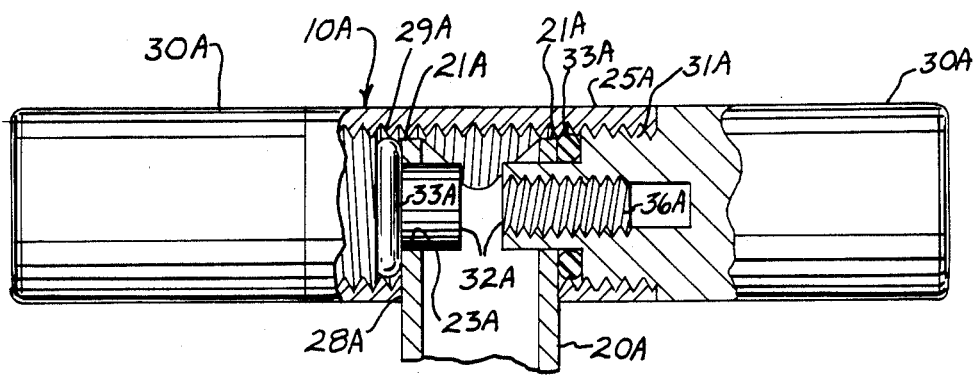
FIG. 3 is a partial view similar to that of FIG. 1 showing another embodiment.

Referring to the embodiment generally-10A shown in FIG. 3, all of the previous components are designated with the same numbers followed by the letter A. The difference between embodiment 10 and 10A is the fact that the indexing rings 35 are no longer utilized and neither are the brass washers 34. This shows the versatility of the handle assembly of this invention. They can be converted to other assemblies without the indexing rings and still provide a tight connection with the thimble 25A as well as with the stem portion 20A. As the indexing rings are no longer utilized, neither are the brass washers 34. Accordingly, they are eliminated. This allows the threaded portions 31A to be screwed into the threads 29A of the thimble 25A for a greater distance. The O-rings 33A provide a resilient connection.

Figure 4:
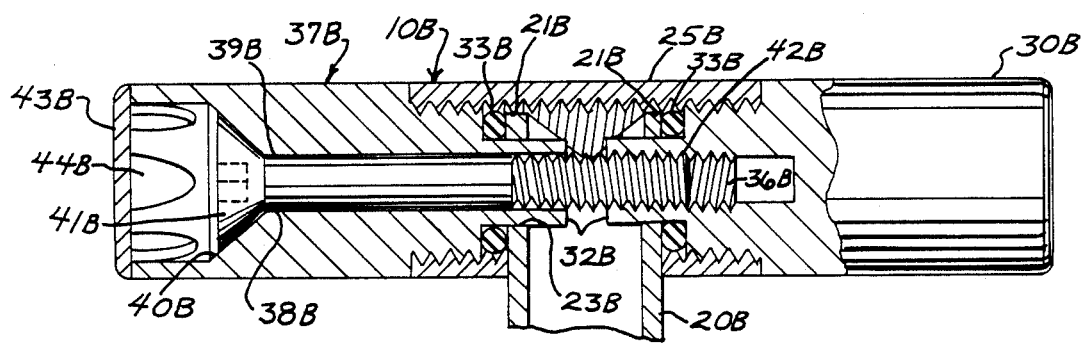
FIG. 4 is a view in partial vertical cross section showing still another embodiment.

According to FIG. 4, embodiment 10B provides a more tamper resistant version for the handle assembly. The previous components are designated with the same numbers followed by the letter B. The tamper resistant version is afforded by utilizing a modified end piece 37B having a through bore 38B to receive the screw 39B. The screw 39B has the threads 42B for engagement with internal threads 36B inside the handle end piece 30B. Handle end piece 37B has a compartment 40B for receiving the screw head 41B. A cap 43B with the resilient fingers 44B is placed over the compartment 40B so as to conceal the screw head 41B. The fingers 44B provide a frictional engagement means. If desired, an adhesive can be employed to seal the fingers 44B into the compartment. This would further resist removal of the cap 43B.

Figure 5:
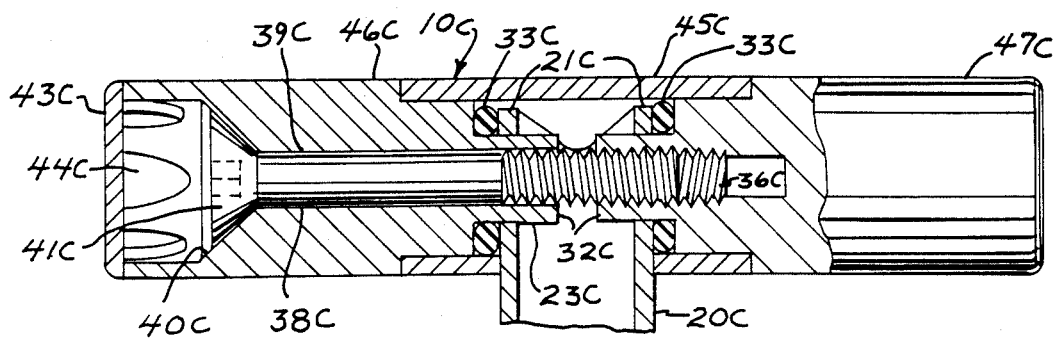
FIG. 5 is a view similar to FIG. 4 showing yet another embodiment of the invention.

FIG. 5 illustrates yet another embodiment of the handle assembly generally 10C. The previous components are designated with the same numbers followed by the letter C. This embodiment 10C is similar to 10B in utilizing the internal screw 39C and the cap 43C. It will be seen that the threads on the thimble 45C have been eliminated as have been the threads on the handle end pieces 46C and 47C.

Figure 6:
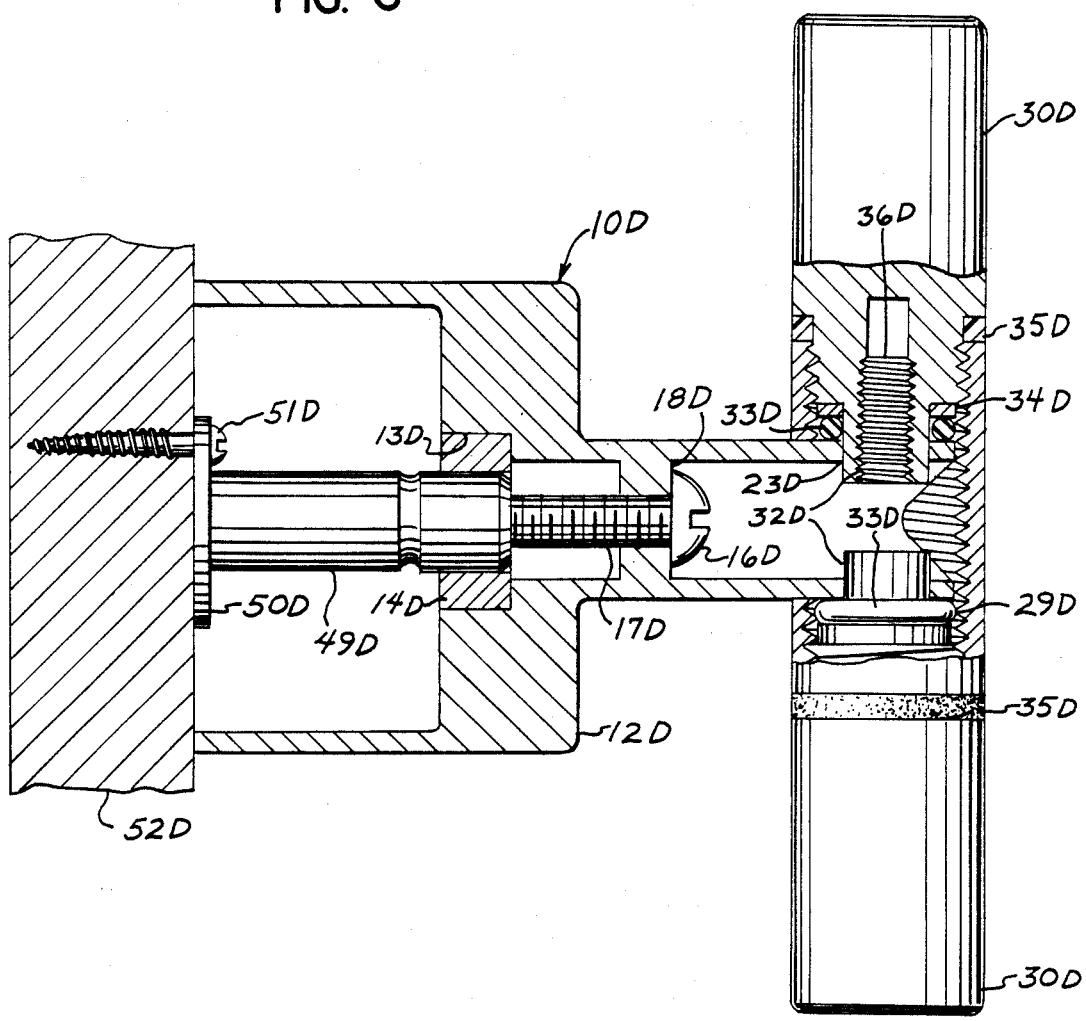
FIG. 6 is a view similar to FIG. 1, but showing a wall mounted robe hook assembly.

FIG. 6 depicts how assemblies of this type can be used for a wide variety of handle or the like functions. In this case, the assembly is a bathroom accessory, a robe hook generally 10D. The previous components are designated with the same numbers followed by the letter D. In this instance the embodiment is the same as depicted in FIG. 1 except the valve stem 11 has been replaced by a base bracket which has a support 49D shaped like a valve stem and from which extends a flange 50D. A screw 51D passes through the flange 50D and into the wall 52D. The embodiments of FIGS. 3, 4, 5, and 7-9 can similarly be employed.

Figure 7:
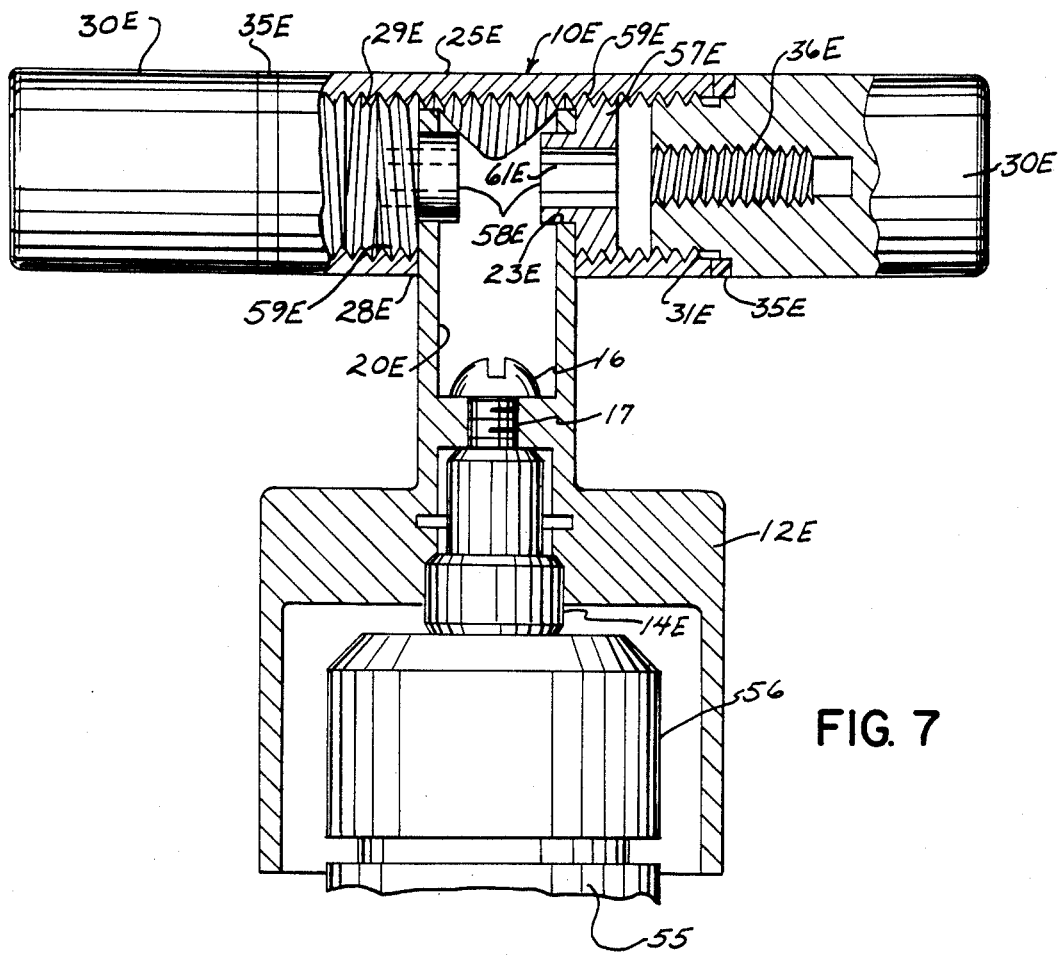
FIG. 7 is a view similar to FIG. 1 showing a preferred embodiment.
Figure 8:
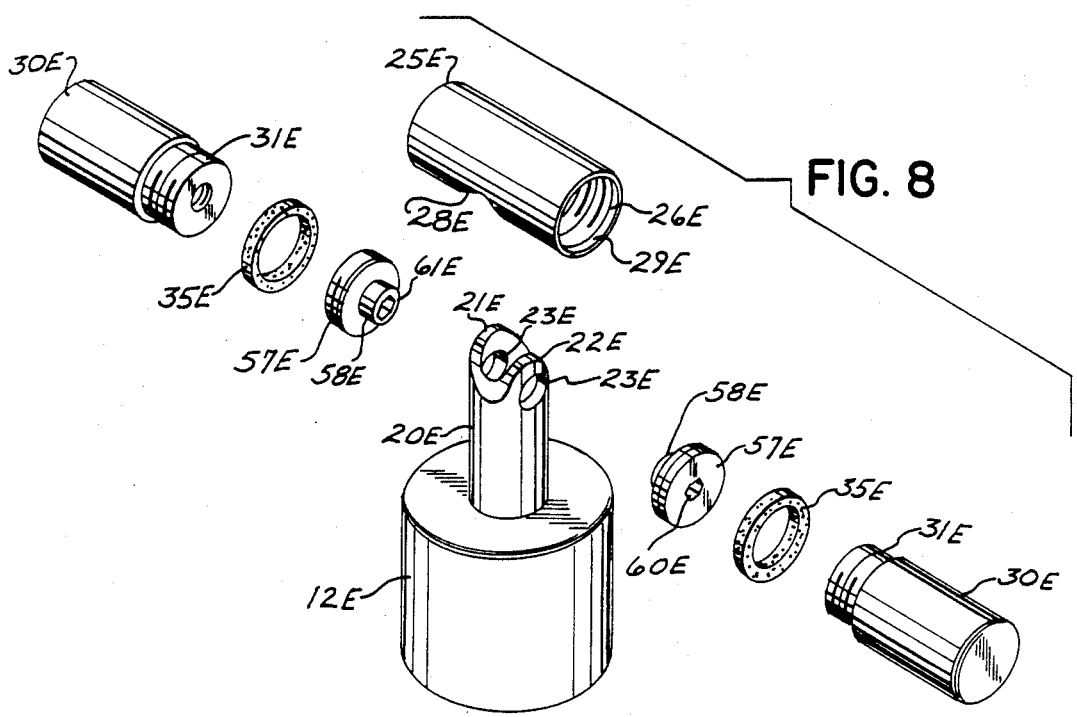
FIG. 8 is an exploded perspective view of the parts shown in FIG. 7.

FIGS. 7 and 8 show yet another embodiment of the handle assembly generally 10E. The previous components are designated with the same numbers followed by the letter E. This embodiment 10E is similar to 10. However there is one important difference in providing the additional vandal resistant screws 57E. These have a reduced diameter portion 58E for fitting into the openings 23E of the stem portion 20E. An allen wrench non-circular hole 60E is provided which facilitates wrench tightening. The screws 57E have external threads 59E for engagement with the internal threads 29E of the thimble 25E. The engagement of the screw 57E with the thimble 25E and the extension of the reduced diameter portion 58E into the stem opening 23E as well as the engagement of the end pieces 30E in the thimble 25E provide a very sturdy handle assembly. The handle assembly 10E is shown in conjunction with a valve assembly 55 including a stabilizer portion 56.

Figure 9:
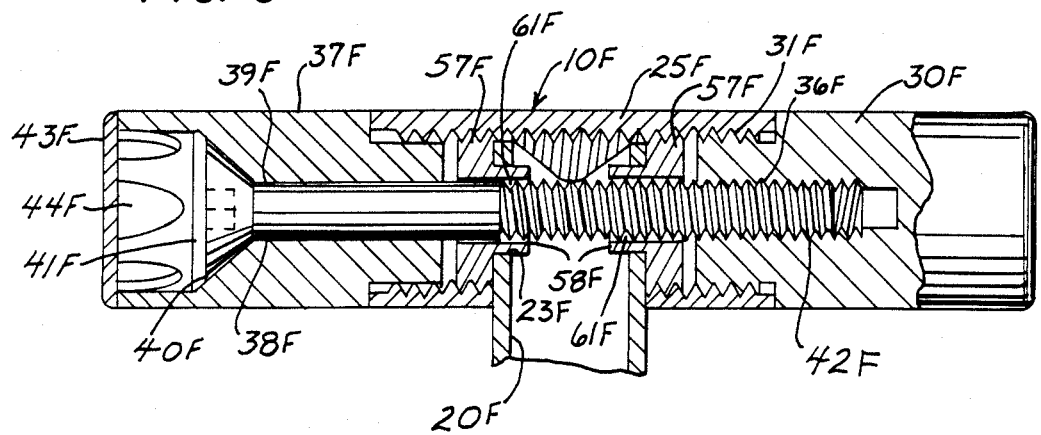
FIG. 9 is a view in partial vertical cross section showing yet another embodiment.

According to FIG. 9, embodiment 10F provides an even more tamper resistant version for the handle assembly 10E. The previous components are designated by the same numbers followed by the letter F. This handle assembly incorporates the tamper-resistant components of the handle assembly 10B. Through bore 61F is provided in the screws 57F to afford passage of the screw 39F.

Thus, the invention provides an improved faucet handle assembly or the like. While the preferred embodiments have been described above, it is readily apparent to those skilled in the art that a number of modifications and changes may be made without departing from the spirit and scope of the invention. For example, in the FIG. 1 embodiment, there are internal threads 36 shown in the extension portions 32 of the handle pieces 30 and in the FIG. 7 embodiment, there are internal threads 36E in the reduced diameter portion 31E. These can be eliminated as a threaded connection is made between threaded portions 31, 31E and the internal threads 29, 29E of the thimbles 25, 25E. However having the internal threads 36, 36E offers the advantage of one component being used with the threaded thimble 25 and/or the screws 39B and 39F as indicated in FIGS. 4 and 9. The same is true concerning embodiments 10A without the indexing rings. Embodiments 10B, 10C and 10F do not include the indexing rings 35. These could be included in these embodiments and the brass washers 34 could be included in embodiments 10B and 10C. As an additional modification one of the handle pieces 30 could form a handle arm integral with the thimble 25. All such and other modifications are meant to be within the scope of the invention.

We claim:

1. A handle assembly or the like connectable to a support comprising:
    an open-ended sleeve which is connectable to the support by a fastener inserted and removed through the open end, the sleeve having at least one cross opening near the open end;
    a thimble portion that covers the open end and has at least one opening aligned with the cross opening;
    a first cross member engageable in said opening of said thimble that has an extension portion for placement in a cross opening of said sleeve;
    a handle arm not integral with the first cross member that extends from said thimble portion opposite said first cross member; and
    threaded connecting means disposed within said thimble portion to hold said thimble portion and said first cross member in place.

2. The handle assembly of claim 1, wherein the first cross member is positionable entirely between the ends of the thimble when the assembly is assembled, and a second cross member can cover the thimble opening and hide said first cross member from view.

3. The handle assembly of claim 2, wherein the first cross member has a non-circular hole in its outer surface to facilitate threaded engagement of the first cross member to the assembly.

4. A handle assembly or the like connectable to a support comprising:
    an open-ended sleeve which is connectable to the support by a fastener inserted and removed through the open end, the sleeve having aligned opposite cross openings near the open end;
    a thimble that covers the open and has opposite openings aligned with the cross openings;
    a first cross member engageable in an opening of said thimble;
    a second cross member not integral with the first cross member engageable in the opposite opening of said thimble; and
    threaded connecting means disposed between the ends of said thimble to hold said thimble and said first and second members in place; wherein both cross members include an extension portion for placement in a respective cross opening of said sleeve.

5. The assembly of claim 4, wherein said cross members are substantially identical to each other.

6. The assembly of claim 4, wherein the threaded connecting means includes at least one set of matable threads on the interior of the thimble and on the exterior of a cross member.

7. A handle assembly or the like connectable to a support comprising:
    an open-ended sleeve which is connectable to the support by a fastener inserted and removed through the open end, the sleeve having aligned opposite cross openings near the open end;
    a thimble that covers the open end, the thimble having opposite openings aligned with the cross openings and being internally threaded;
    a first cross member engageable in an opening of said thimble, the first member having external threads for engagement with the internal threads of said thimble, said first cross member also having an extension portion for placement in a cross opening of said sleeve; and
    a second cross member not integral with the first cross member engageable in openings of said sleeve and said thimble, the second member having external threads for engagement with the internal threads of said thimble;
    the threads of said thimble, and said first and second cross members holding said thimble and said first and second members in place.

8. A handle assembly or the like connectable to a support comprising:
    an open-ended sleeve which is connectable to the support by a fastener inserted and removed through the open end, the sleeve having aligned opposite cross openings near the open end;
    a thimble that covers the open end and has opposite openings aligned with the cross openings;
    a first cross member engageable in an opening of said thimble;
    a second cross member not integral with the first cross member engageable in the opposite opening of said thimble; and
    threaded connecting means disposed between the ends of said thimble to hold said thimble and said first and second members in place, said threaded connecting means including a screw secured in an axial through bore of one of said cross members and threads in the other of said cross members for engagement of said screw threads.

9. The assembly of claim 8, wherein said cross member through bore includes a compartment for housing the head of said screw, and the assembly further comprises a cap member secured over said screw head to conceal the head of said screw.

* * * * *

UNITED STATES PATENT AND TRADEMARK OFFICE
CERTIFICATE OF CORRECTION

PATENT NO. : 4,829,632

DATED : May 16, 1989

INVENTOR(S) : Freier et al.

It is certified that error appears in the above-identified patent and that said Letters Patent is hereby corrected as shown below:

Column 1, line 54    after "by" insert --a--

Column 1, line 62    "fist" should be --first--

Column 6, line 5     after "open" insert --end--

Signed and Sealed this

Twenty-seventh Day of March, 1990

Attest:

JEFFREY M. SAMUELS

*Attesting Officer*   *Acting Commissioner of Patents and Trademarks*